United States Patent [19]

Chen et al.

[11] Patent Number: 5,287,293
[45] Date of Patent: Feb. 15, 1994

[54] METHOD AND APPARATUS FOR INSPECTING THE CONTOURS OF A GEAR

[75] Inventors: Hsien-Yei Chen; Chung-Mu Hwang; Jung-Lung Chang; Chieh-Yu Lin; Ruey-Yang Wang; Jyh-Jye Jeng, all of Hsinchu, Taiwan

[73] Assignee: Industrial Technology Research Institute, Hsinchu, Taiwan

[21] Appl. No.: 76,085

[22] Filed: Jun. 14, 1993

Related U.S. Application Data

[63] Continuation of Ser. No. 636,119, Dec. 31, 1990, abandoned.

[51] Int. Cl.$^5$ .............. G06F 15/46; G06F 15/70
[52] U.S. Cl. .............. 364/551.01; 364/507; 364/552; 382/8
[58] Field of Search .............. 364/506, 507, 525, 552, 364/551.01, 551.02; 358/101; 382/8, 23, 25; 356/102

[56] References Cited

U.S. PATENT DOCUMENTS

| | | | |
|---|---|---|---|
| 4,368,522 | 1/1983 | Späth et al. | 364/507 |
| 4,433,385 | 2/1984 | De Gasperi et al. | 364/552 |
| 4,484,081 | 11/1984 | Cornyn, Jr. et al. | 364/507 X |
| 4,587,617 | 5/1986 | Barker et al. | 364/507 |
| 4,644,583 | 2/1987 | Watanabe et al. | 382/25 X |
| 4,697,245 | 9/1987 | Kara et al. | 364/552 |
| 4,858,157 | 8/1989 | Murai et al. | 364/525 X |
| 4,896,278 | 1/1990 | Grove | 364/507 X |
| 5,040,228 | 8/1991 | Bose et al. | 382/8 |
| 5,046,111 | 9/1991 | Cox et al. | 364/552 X |
| 5,058,177 | 10/1991 | Chemaly | 382/8 |
| 5,077,806 | 12/1991 | Peters et al. | 358/101 X |
| 5,103,304 | 4/1992 | Turcheck, Jr. et al. | 358/101 |

Primary Examiner—Kevin J. Teska
Attorney, Agent, or Firm—Cushman, Darby & Cushman

[57] ABSTRACT

A method and apparatus for the automatically inspecting the contours of a gear for manufacturing errors. According to the method, a gear to be inspected is imaged on an imaging surface to form a gear image. A digitized image indicative of the gear image is generated. The digitized image comprises a plurality of pixels. The pixels each have a gray value and coordinates which represent the location of the pixel within the digitized image. Each pixel is classified into a first or a second class by comparing the gray value of the pixel to a predetermined threshold value. The coordinates of pixels corresponding to the contours of the gear are determined from the classes of pixels. The manufacturing errors of the gear are calculated by comparing the coordinates of the pixels corresponding to the contours of the gear to a standard gear pattern. The apparatus, in its preferred embodiment, includes a base and collimated light source to illuminate the gear, a microscope to magnify an image of the gear and a CCD camera to generate a digitized image indicative of the magnified gear image. A digital computer is also included to assign a gray value to each pixel in the digitized image, to classify each pixel into a first or second class by comparing the gray value of the pixel with a predetermined threshold value, to determine the coordinates of pixels corresponding to the contours of the gear and to calculate the manufacturing errors of the gear by comparing the coordinates of pixels corresponding to the contours of the gear with a standard gear pattern. The manufacturing errors include runout error, pitch error and profile error.

33 Claims, 8 Drawing Sheets

METHOD AND APPARATUS FOR INSPECTING THE CONTOURS OF A GEAR

This is a continuation of application No. 07/636,119, filed on Dec. 31, 1990 now abandoned.

BACKGROUND OF THE INVENTION

1. Field of the Invention

The present invention is related to a method and an apparatus for inspecting the contours of a gear, particularly to a method and an apparatus for fast, accurately and efficiently measuring the manufacturing errors of the contours of a precision involute spur gear.

2. Description of the Prior Art

Conventionally, the measurements of the manufacturing errors of a spur gear are accomplished by using a probe and a dial gage. In view that this process requires a direct mechanical contact with the gear teeth, the measurement of one single gear takes much a long time and requires a highly skilled operator. When measuring a precision miniature spur gear, a profile projector is used first to magnify and project the gear image on a screen. The measurements are then taken by manually comparing the projected gear image with a standard gear pattern. This process is also quite time-consuming.

In view of the plenty of time spent on the inspection of one single gear by the two measuring methods, only a few samples are selected for inspection in the quality control process among a large number of mass manufactured gears. Moreover, the accuracy of the measurements is dependent highly on the skills of the operator. In this manner, the results of the measurement may be notably diversified among different operators. Thus, the quality of a large number of mass produced gears is certainly not very well assured.

SUMMARY OF THE INVENTION

It is, therefore, a primary object of the present invention to provide a method and an apparatus for automatically measuring the manufacturing errors so as to save time and laborious works involved in the prior art.

A further object of the present invention is to provide a method and an apparatus for measuring the manufacturing errors more precisely.

Still a further object of the present invention is to provide a method and an apparatus which are capable of measuring fast and are easy to operate, so that every single gear produced is able to go through the inspection process.

The advantages of such an invention are obvious that a significant increase of production quality is achieved and cost in technical personnel training is considerably reduced.

According to the present invention, a method is provided for measuring the manufacturing errors of a gear, which comprises the steps of:

(a) calibrating the image coordinates;
(b) magnifying the pattern image of the gear under inspection;
(c) photographing and converting the magnified pattern image into digital form ;
(e) thresholding the gray values of the digital image into two pixel classes;
(f) extracting the contours of the bilevel-thresholded digital image;
(g) determining the coordinates of the pixels on the contours;
(h) comparing the contour informations with a standard gear pattern for finding the manufacturing errors.

According to another aspect of the present invention, an apparatus is Provided for measuring the manufacturing errors of a gear, which comprises
means for magnifying optical image;
means for optical-to-digital image conversion; and
an image processing station coupled to the second means, which includes
an image grabber card for receiving the digital an image from said second means;
a data processing unit for processing digital informations;
means for thresholding the digital image to a bilevel digital image;
means for extracting the contours of the digital image;
means for finding the manufacturing errors of the gear, which includes first means for finding the runout error; second means for finding the profile error; and third means for finding the pitch error.

One special aspect of this invention is that there is provided a mask with calibration patterns with the invention. This mask is used to calibrate the image coordinates before actually taking a gear for inspection.

One further special aspect of this invention is that there is provided a laser indicator for quickly positioning a gear under inspection.

Still one further special aspect of this invention is that there is provided a focusing scale for quickly adjusting the focus of the image-magnifying means.

BRIEF DESCRIPTION OF THE DRAWINGS

For a detailed understanding of the overall system configuration and the measurement processes of the present invention described above, a reference may be made to the following detailed description in conjunction with the accompanying drawings, wherein:

FIG. 1A is a block diagram showing the image processing procedures;

DESCRIPTION OF THE PREFERRED EMBODIMENT

Figure 1:
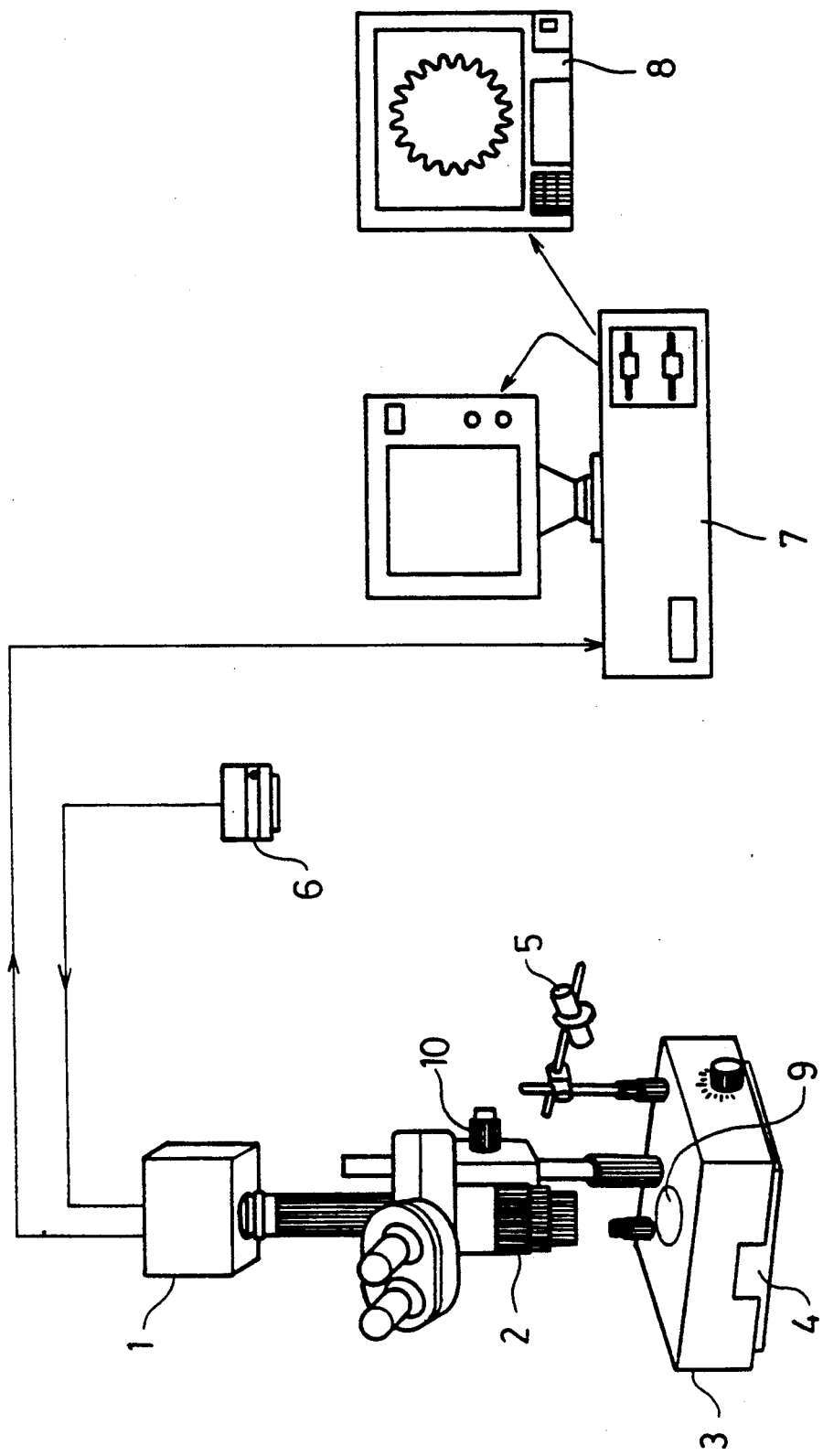
FIG. 1 shows the system configuration of a preferred embodiment of the present invention.
Figure 1:
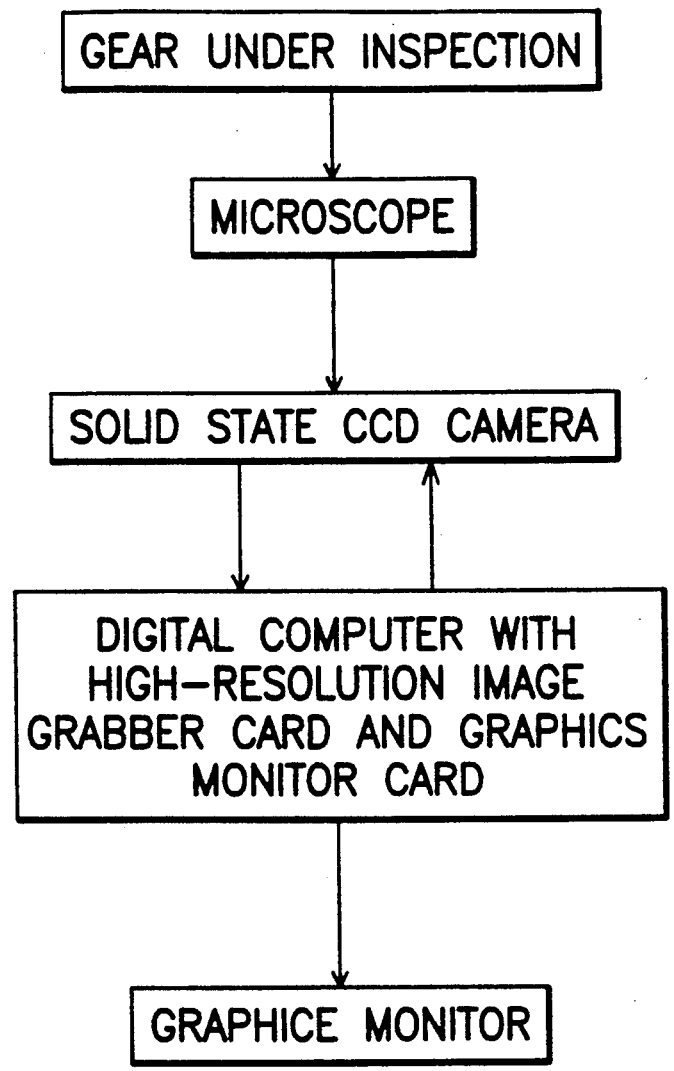

FIG. 1 shows the apparatus according to this invention. As shown in FIG. 1 & 1-A. the apparatus comprises a high-resolution solid state charge coupled device (CCD) camera 1, a high-magnification aberration-free microscope set 2, a base 3, a collimated light source 4, a laser indicator 5, a power supply 6 for the CCD camera 1, a digital computer 7 and a high-resolution graphic monitor 8. The gear 9 under inspection is placed on the base 3 and illuminated by the collimated light source 4 from underneath. The image of the gear 9 is magnified by the microscope 2 and photographed by the CCD camera The CCD camera 1 then digitizes the photographed image and sends the digital image to the digital computer 7 for further processing. The CCD camera 1 is driven by a power supply 6. The high-resolution graphic monitor 8 is connected to the digital computer 7 for displaying the digital image of the gear 9. The laser indicator 5 is used to indicate the proper position on the base 3 where the gear 9 should be placed. Moreover, the digital computer 7 has installed a high-resolution image grabber card and a high-resolution graphic monitor adaptor card (both are not shown) in its expansion slots for the acquisition of image data and displaying of the digital image.

Hereinafter, the processes performed by this preferred embodiment for finding the manufacturing errors of the inspected involute gear 9 will be described in detail.

Figure 9:
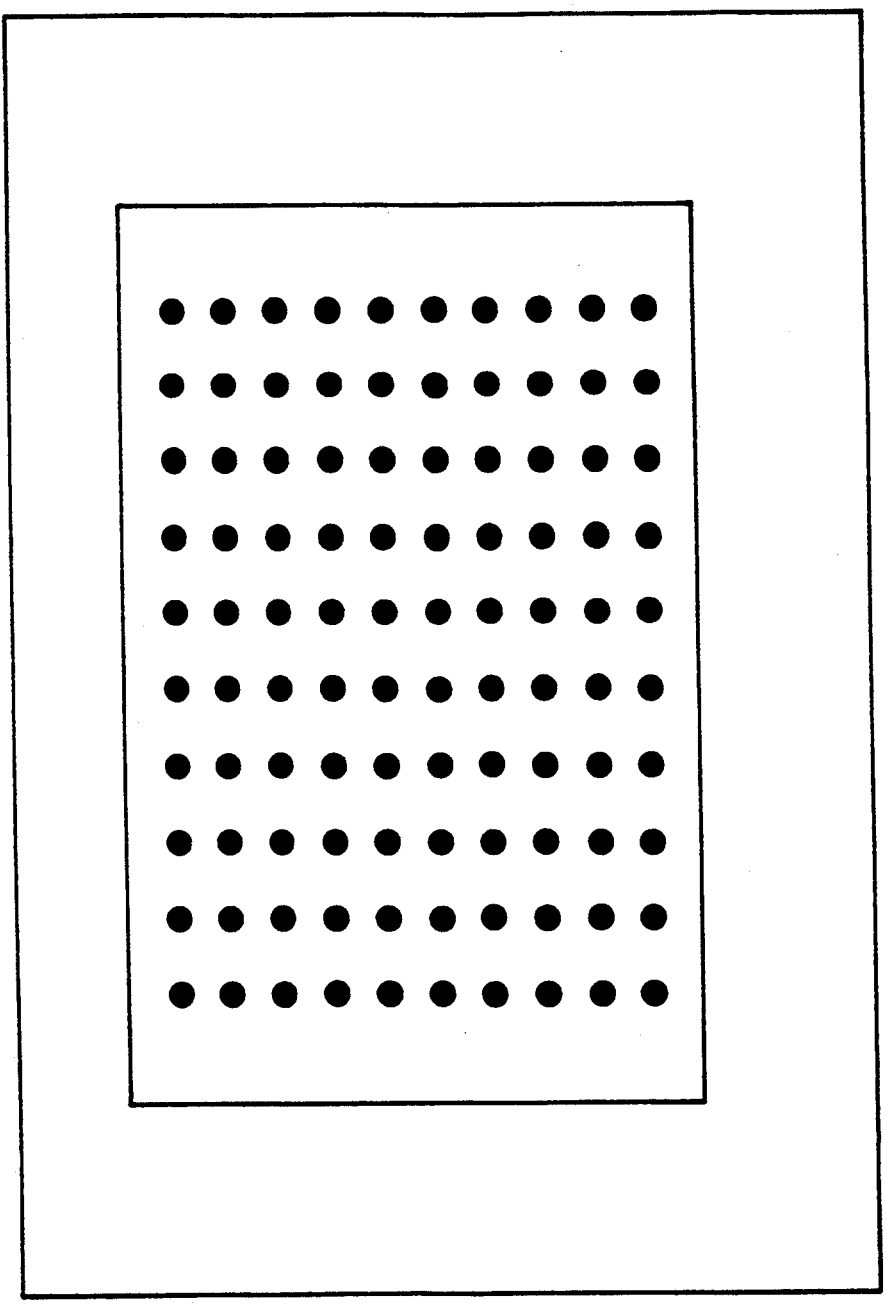
FIG. 9 shows a mask with a matrix of circular dots for the calibration of image coordinates.

(A) Calibrating process: The first step in the measurements is to make a calibration of the image coordinates. This is done by positioning a mask coated with 100 calibration circular dots (as shown in FIG. 9) on the base 3. The image of the mask will be taken in digital form into the digital computer 7 and processed by a software routine which is capable of locating the coordinate of the center of each of the circular dots and producing a 3×3 conversion matrix. The conversion matrix will be stored and thereafter used to calibrate the image coordinates of the gear 9.

(B) Magnifying process: the second step is to place the gear 9 under inspection on a proper position on the base 3 indicated by the laser indicator 5. Due to the unequal thickness between the gear 9 and the mask, the microscope 2 has to be refocused in order to avoid errors caused by different depths of field. An indexing scale fixed on the focusing knob 10 is used to index the position of the microscope 2 where the gear 9 image is in focus. This helps saving time in this process. The picture of the gear 9 under inspection is then magnified by the microscope 2.

(C) Photographing and converting process: the magnified optical image is photographed and further converted to digital form by the CCD camera 1. The gray values of the pixels in the digitized image are given according to a scale ranging from 0 to 255.

(D) Storing process: the informations of the digital image is sent to the digital computer 7 by way of an image grabber card which is installed in the expansion slots of the digital computer 7.

(E) Bilevel-thresholding process: As described above, the gray values of the digital image range from 0 to 255. In this step, a process, which is implemented by a software routine, is utilized for thresholding the pixel values into two pixel classes, the below threshold pixels (binary value 0) and above threshold ones (binary value 1).

(F) Contour-extracting process: This is a process for extracting the contours out of the bilevel-thresholded digital image. This software routine utilizes a known contour-tracing algorithm which is capable of locating the coordinates of the pixels on the contour of a pattern in the digital image.

(G) Subpixel coordinate value determining process: This is a process, which manipulates the contour informations resulting from the contour-extracting process together with the data of the original digital image, and utilized a moment-preserving technique adapted for 2-D image processing, for determining the coordinates of the pixels on the contours more precisely to subpixel values. The technique of moment-preserving has been disclosed and published on the IEEE Journal of PAMI, page 188-198, by two senior members, Dr. Alij Tabatabai and Dr. O. Robert Mitchell. The technique is described briefly as follows:

(1) The first three order moments of the input data sequence are defined as $$m_i = (1/n) * \sum_{j=1}^{n} X_j^i \quad i = 1, 2, 3$$

where
n number of pixels
$X_j$: the gray value of the jth data
$m_i$: the ith order moment (2) Let $h_1$ denote the gray value of a certain pixel on the contour of the digital image, and k denote the number of pixels with this gray value $h_1$, then the probability $P_1$ for these pixels is given by k/n, and $$\sum_{q=1}^{2} P_q = 1$$

(3) To let the moments of the output data equal the moments of the input data, i.e. to preserve the moments, we have the three equalities:

$$\sum_{q=1}^{2} P_q * (h_q)^i = \overline{m}_i \quad i = 1, 2, 3$$

(4) The above three equations have three unknowns $p_1$, $h_1$ and $h_2$. They can be solved as:

$$h_1 = \overline{m}_1 - \sigma*(P_2/P_1)$$

$$h_1 = \overline{m}_2 - \sigma*(P_1/P_2)$$

$$P_1 = (\tfrac{1}{2})*[1 - S*\{1/(4+S^2)\}]$$

where
$S = (\overline{m}_3 + 2*\overline{m}_1^3 - 3*\overline{m}_1*\overline{m}_2)/\sigma^3$
$\sigma = (\overline{m}_2 - \overline{m}_1^2)$ (5) After $P_1$ has been found, the edge location k is then determined by $k = n*p_1$.

There are three manners which can be used to determine the contour of the image of the gear 9 by moment preserving technique, i.e.

(a) Take the gray values of 10 pixels neighboring a pixel on the contour in the vertical or horizontal direction.

(b) Take the gray values of 10 pixels neighboring a pixel on the contour in 45 degrees direction.

(c) Take the gray values of 10 pixels neighboring a pixel on the contour in 135 degree direction.

Figure 2:
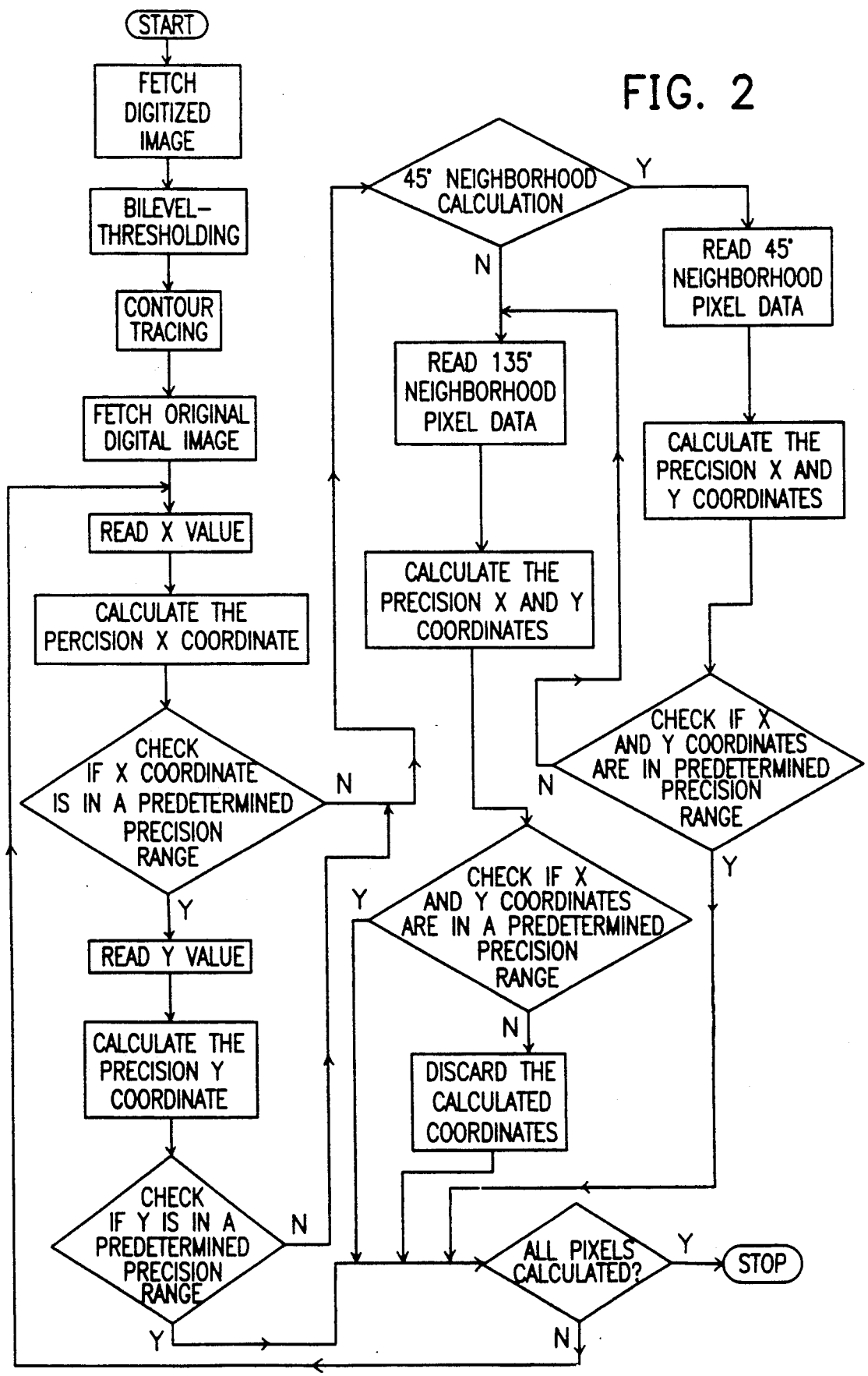
FIG. 2 is a flowchart showing the algorithm for finding the precise coordinates of each pixel on the edge of the gear image to a subpixel value.

The precise edge coordinates by the methods of (b), (c) have to be further determined by trigonometric operations, as shown in the flowchart of FIG. 2.

(H) Comparing processes: the data of the precise edge coordinates of the image of the gear 9 are processed by three routines which are capable of determining the manufacturing errors of the gear 9. The calculated errors will be printed out automatically on an output peripheral of the digital computer 7. The algorithms implemented by the computer software for determining the runout, profile and pitch errors of the gear 9 will be discussed respectively in the following. The associated equations have been derived by using the mathematics of trigonometry and analytical geometry.

Figure 3:
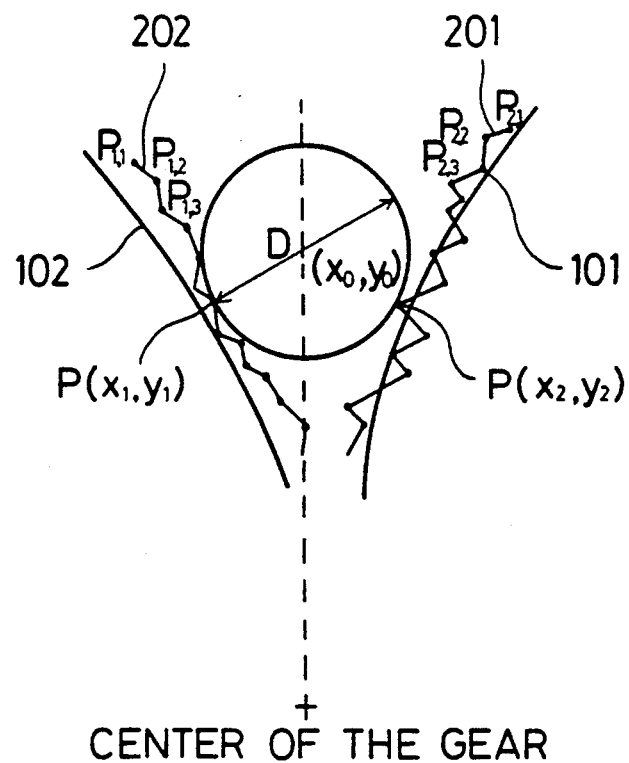
FIG. 3 is a geometric illustration showing how to determine the runout errors of a gear.

(1) Method for calculating the runout errors of the gear:

Referring to FIG. 3, the curves 101, 102 represent the ideal tooth profile and the zigzag curves 201, 202 represent the empirical tooth profile. Assume that there is a circle (a sphere in 3D), whose diameter is half a gear pitch, disposed in tooth space formed between two neighboring teeth. If we move the circle toward the center of the gear, the circle will be eventually be chocked by two neighboring teeth, and the coordinates of the center of the circle and the distance between the center of the circle and the center of the gear can be determined. If we repeat the same procedure at every tooth space, then a set of numerals denoting the distances will be obtained. Runout error is the difference between the maximum distance and the minimum distance.

A computer process is capable of judging whether the circle is choked or not by calculating the distances between a set of points ($P_{11}$, $P_{12}$, $P_{13}$...) on the left profile of a tooth and another set of points ($P_{21}$, $P_{22}$, $P_{23}$...) on the right profile. Furthermore, the following should be taken into consideration during this process for determining the runout errors.

(a) Distances between all the points on the left profile and all the points on the right side have to be calculated. If the distance is larger than the diameter of the circle, the circle will not be choked and this procedure will be continued until an equality is found.

(b) If the circle is chocked by two points, then the coordinates of the center of the circle ($X_0$, $Y_0$) can be calculated by way of the coordinates of the two points ($X_1$, $Y_1$), ($X_2$, $Y_2$) and the diameter D. There will be two solutions to the coordinates ($X_0$, $Y_0$) and the one which lies farther from the center of the gear is taken as the proper one.

(c) There would be a number of pairs of points which are capable of choking the circle (distance equals the diameter). The one which makes the center of the circle farthest from the center of the gear is taken, since this pair of points would choke the inward-moving circle prior to others.

The mathematic operations will be described hereinafter. Referring to FIG. 3, calculations start from two edge points $P_{11}$ and $P_{12}$, and the process is repeated along each profile until a distance of the two points d is equal to or less than the diameter D, where $$d = [(X_1 - X_2)^2 + (Y_1 - Y_2)^2]^{1/2}$$

If d=<D then the coordinates of the center of the circle will be calculated. With known ($X_1$, $Y_1$). ($X_2$, $Y_2$) and diameter D, and let ($X_0$, $Y_0$) denote the coordinates of center of the circle, ($X_0$, $Y_0$) can be determined as follows:

If $Y_2 - Y_1 \neq 0$ then

-continued
$$X_0 = [-B \pm (B^2 - 4 * A * C)]/(2 * A)$$
$$Y_0 = m * x + b$$

where $$m = -[(X_2 - X_1)/(Y_2 - Y_1)]$$
$$b = (-X_1^2 + X_2^2 - Y_1^2 + Y_2^2)/[2 * (Y_2 - Y_1)]$$
$$A = 1 + m^2$$
$$B = 2 * m * b - 2 * X_1 - 2 * m * Y_1$$
$$C = X_1^2 + Y_1^2 - 2 * b * Y_1 + b^2 - (D^2/4)$$

and if $Y_2 - Y_1 = 0$ then
$$X_0 = m * y + b$$
$$Y_0 = [-B \pm (B^2 - 4 * A * C)]/(2 * A)$$

where $$m = -[(Y_2 - Y_1)/(X_2 - X_1)]$$
$$b = (-X_1^2 + X_2^2 - Y_1^2 + Y_2^2)/[2 * (X_2 - X_1)]$$
$$A = 1 + m^2$$
$$B = 2 * m * b - 2 * Y_1 - 2 * m * X_1$$
$$C = X_1^2 + Y_1^2 - 2 * b * X_1 + b^2 - (D^2/4)$$

The point ($X_0$, $Y_0$) has tow solutions, the one which lies farther from the center of the gear should be taken as the proper solution.

Figure 4:
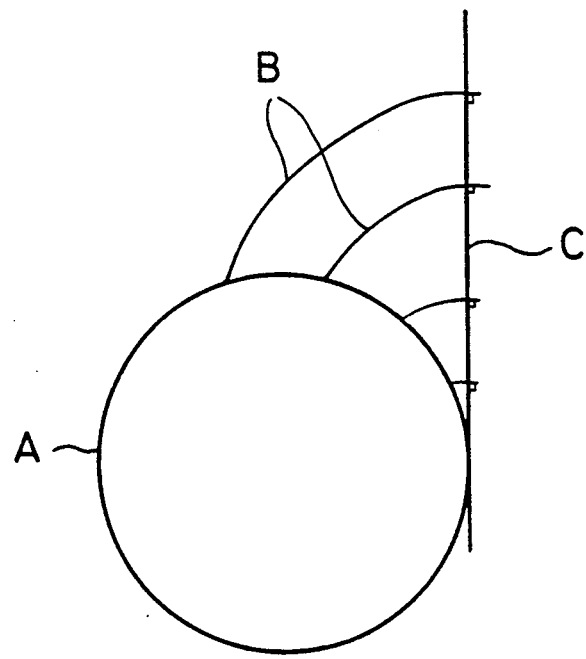
FIG. 4 is a geometric illustration showing the relations between involutes and tangential lines of the base circle of an involute gear.
Figure 5:
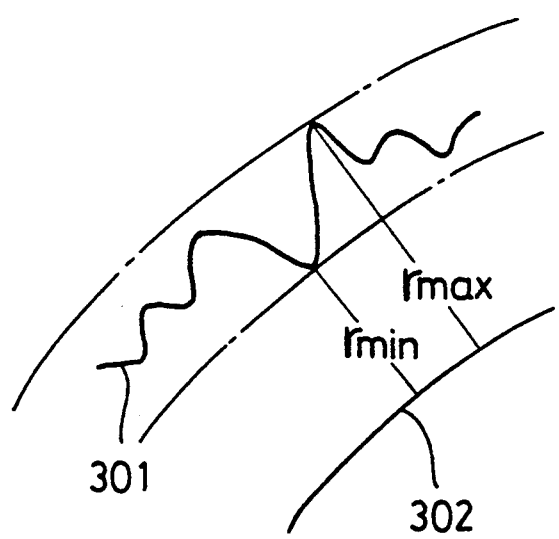
FIG. 5 is a geometric illustration demonstrating the definition of the profile errors of a gear.

(2) Method for calculating the profile errors of the gear:

Referring to FIG. 4, the tangent line C to the base circle A of a involute gear is orthogonal to the involutes B of the base circle. As shown in FIG. 5, if the maximum and the minimum errors between the profile 301 and the ideal standard profile 302 are $r_{max}$ and $r_{min}$ respectively, then the profile error is defined as $r_{max} - r_{min}$.

Moreover, if we represent the left and right profile of the gear in polar coordinates, then the equations in polar coordinate for the points on the left profile of the gear 9 are:

$$X_p = r_b * sin(\theta) - r_b * \theta * cos(\theta)$$

$$Y_p = r_b * cos(\theta) - r_b * \theta * sin(\theta)$$

the equations in polar coordinate for the points on the right profile of the gear 9 are:

$$X_p = -[r_b * sin(\theta) - r_b * \theta * cos(\theta)]$$

$$Y_p = r_b * cos(\theta) - r_b * \theta * sin(\theta)$$

where $r_b$: radius of the base circle $\theta$: angle in polar coordinates $X_p$: x coordinate in rectangular coordinate system $Y_p$: y coordinate in rectangular coordinate system The calculations of the profile errors are described hereinafter.

Figure 6:
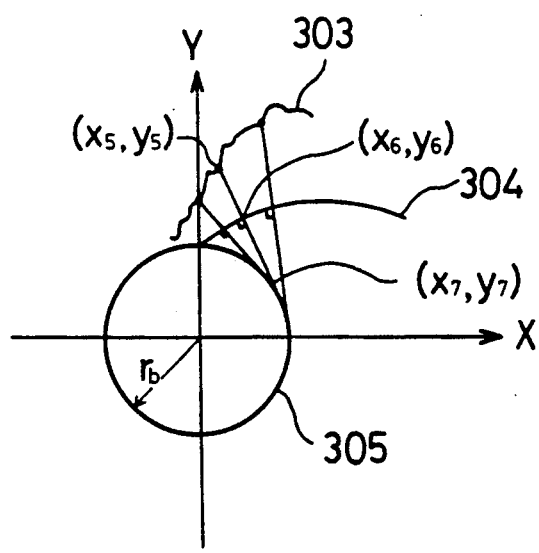
FIG. 6 is a geometric illustration showing the determination of the profile errors of a gear.

FIG. 6 shows the left profile 303 of a tooth of the gear 9. If we shift the starting point of the effective segment of the profile to a point on the Y axis, then we can select an arbitrary point ($X_5$, $Y_5$) on the profile, and draw a line tangent to the base circle 305 therefrom. The tangent line will orthogonally intersect the ideal standard profile at point ($X_2$, $Y_2$) and will be tangent to the base circle at point ($X_7$, $Y_7$). If the distance between ($X_5$, $Y_5$) and ($X_1$, $Y_1$) is r, then the profile error is the difference between the maximum distance $r_{max}$ and the minimum distance $r_{min}$.

The mathematic operations are demonstrated hereinafter. Let ($X_0$, $Y_0$) be the coordinates of a certain contour point on the empirical left profile of the gear. If we draw a line tangent to the base circle from the point ($X_0$, $Y_0$), the tangent line will intersect the ideal standard profile 302 at point ($X_6$, $Y_6$), and the coordinates of the point ($X_1$, $Y_1$) can be derived as follows:

$$Y_1 = Y_0 * r_b^2 + [Y_{0hu} \\ 2 * r_b^4 - r_b^2 * (r_b^2 - X_0^2) * (X_0^2 + Y_0^2)]$$

$$X_1 = (r_b^2 - Y_1 * Y_2)/X_0$$

Figure 7:
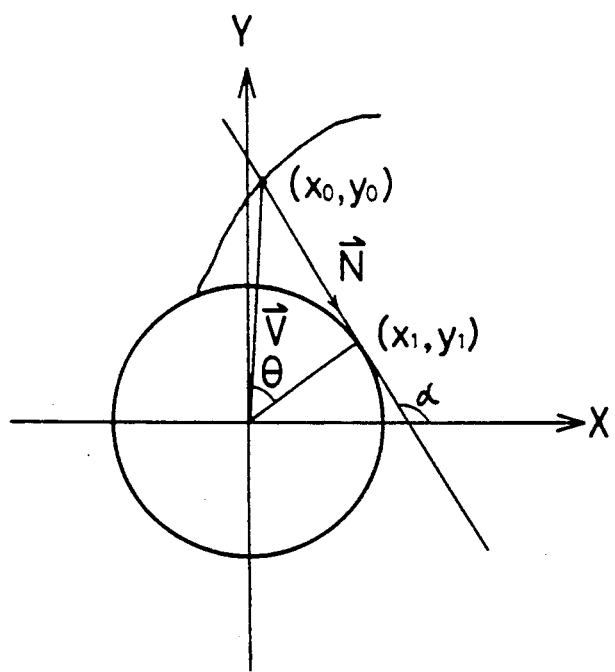
FIG. 7 is a geometric illustration showing the calculation of the profile errors utilizing vector operations.
Figure 8:
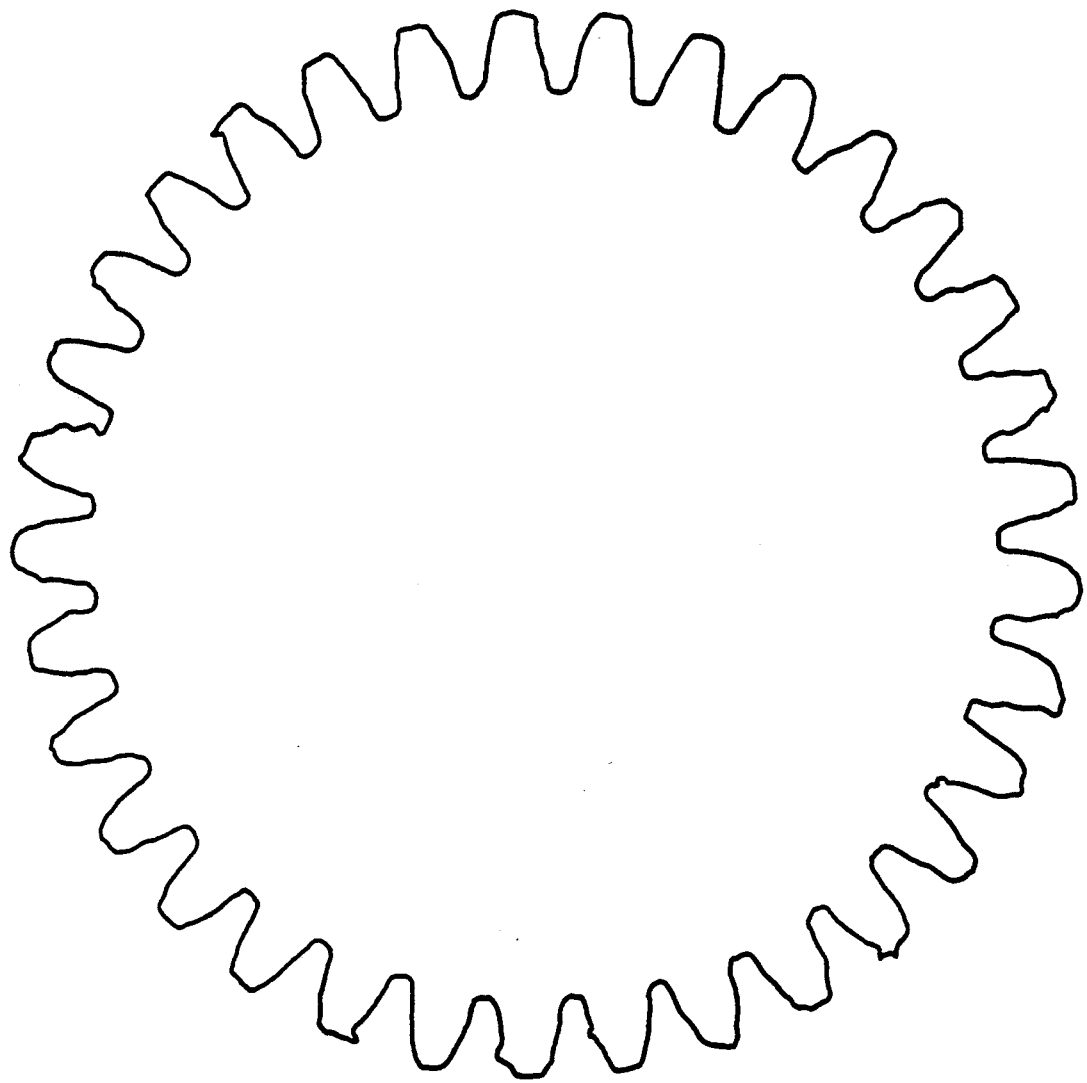
FIG. 8 illustrates a magnified contour of a gear under inspection.

Two solutions are available since two tangent lines can be drawn from a point to a circle. Referring to FIG. 7, if we let $$\overline{N} = [X_1 - X_0, Y_1 - Y_0]$$

$$\overline{V} = [-X_0, -Y_0]$$

then
the point is on the left profile when $\overline{N} \times \overline{V} > 0$, and
the point is on the right profile when $\overline{N} \times \overline{V} < 0$.

Judging from the above criterion, the coordinates of ($X_1$, $Y_1$) can be determined.

The slope of the line segment between point ($X_0$, $Y_0$) and point ($X_1$, $Y_1$) is:

$$slope = tan(Z) = (Y_1 - Y_0)/X_1 - X_0)$$

i.e.

$$\alpha = tan^{-1}[(Y_1 - Y_0)/(i X_1 - X_0)]$$

and
if $tan(\alpha) < 0$ then $\alpha < 0$, $Q = -\alpha$
if $tan(\alpha) = \infty$ then $\alpha = 90°$, $Q = \alpha = 90°$
if $tan(\alpha) > 0$ then $\alpha > 0$, $Q = 180 - \alpha$ The coordinates ($X_2$, $Y_2$) are determined by substituting theta into the following equations:

$$X_p = r_b * sin(\theta) - r_b * \theta * cos(\theta)$$

$$Y_p = r_b * cos(\theta) + r_b * \theta * sin(\theta)$$

Thus ($X_0$, $Y_0$) and ($X_2$, $Y_2$) are known, and the distance r between ($X_0$, $Y_0$) and ($X_2$, $Y_2$) is $$r = [(X_2 - X_0)^2 = (Y_2 - Y_0)^2]^{-\frac{1}{2}}$$

The procedure is repeated for all the points on the profile to find the maximum distance $r_{max}$ and the minimum distance $r_{min}$. The profile error is defined as:

$$profile\ error\ -r_{max} - r_{min}$$

(3) Method for calculating the pitch error of the gear:
There are three kind of pitch errors, namely,
single pitch error,
neighborhood pitch error, and
accumulated pitch error.

The calculations for the three pitch errors are demonstrated below:

(a) If the coordinates of the centers of the circles being chocked at the N tooth spaces are ($X_0$, $Y_0$), ($X_1$, $Y_1$) ... ($X_{n-1}$, $Y_{n-1}$), and $P_{m,n}$ denote the distances between ($X_m$, $Y_m$) and ($X_n$, $Y_n$), then we have the mean distance between two neighboring centers of the circles as $$P_{mean} = [P_{0,1} + P_{1,2} + P_{2,3} + ... + P_{n-1,0}]/N$$

The single pitch error is defined as:

$$single\ pitch\ error = P_{k,k+1} - P_{mean} \quad (1)$$

where
where $k = 0, 1, 2, ..., N-1$ (b) Let
$P_{acc}(0) = P_{0,1}$
$P_{acc}(1) = P_{0,1} + P_{1,2}$
$P_{acc}(2) = P_{0,1} + P_{1,2} + P_{2,3}$
.
.
.
$P_{acc}(N-1) = P_{0,1} + P_{1,2} + P_{2,3} + \\ \quad ... P_{N-2,N-1} + P_{N-1,0}$ Then the accumulated pitch error is given by:

$$accumulated\ pitch\ error = P_{acc}(i) - P_{mean} * X_i \quad (2)$$

where $i = 1, 2, 3..., N$ (c) The neighborhood pitch error for each tooth is:

$$neighborhood\ pitch\ error \\ = ABS(P_{k,k+1} - P_{k+1,k+2}) \quad (3)$$

where $k = 0, 1, 2...N-1$

The algorithms and methods mentioned above are, in this preferred embodiment, implemented by software routines coded using high level computer programming languages, such as FORTRAN or C. These software routines are running on a high speed digital computer for fast calculation and throughput.

One thing special about this present invention is that there is provided an indexing means on the focusing knob of the microscope. This provided means facilitates easy and fast focusing of the microscope. Thus, the time spent on refocusing when changing the object from the mask to the gear under inspection, and vice versa, is saved.

One further advantage of this present invention is that there is provided a microscope for magnifying the miniature precision gears. This facilitates showing the fine details of the gears and, thus, a more precise measurement.

Still another advantage of this present invention is that there is provided a laser indicator for indicating the proper position where the gear under inspection should be placed. This feature facilitates a quick setup of the gear under inspection and, thereby, a simplified operation of this apparatus.

Still another advantage of this present invention is that there is provided a high speed computer and sophisticatedly developed software for calculating the errors. As such, the accuracy and fastness of the measurement are significantly enhanced.

The overall advantages of this present invention are clearly presented in this description. While the invention has been described by way of example and in terms of a preferred embodiment, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

We claim:

1. A method for inspecting contours of a gear to determine manufacturing errors of the gear, comprising the steps of:

(a) imaging the gear to form a gear image on an imaging surface and generating a first digitized image using a CCD camera, the first digitized image indicative of the gear image, the first digitized image comprising a plurality of pixels each having a gray value and each having first coordinates representing a first location of the pixel within the first digitized image;

(b) classifying each pixel into a first or second class by comparing the gray value thereof to a predetermined threshold value;

(c) determining, based on the class of each pixel, the first coordinates of pixels corresponding to contours of the gear;

(d) determining second coordinates of pixels corresponding more precisely to the contours of the gear than the first coordinates; and (e) comparing the second coordinates of pixels to a standard gear pattern to determine the manufacturing errors.

2. A method for inspecting contours of a gear, as recited in claim 1, further comprising the step of imaging a mask having calibration patterns to form a mask image on the imaging surface and generating a second digitized image indicative of the mask image to calibrate the first coordinates of the pixels corresponding to the contours of the gear.

3. A method for inspecting contours of a gear, as recited in claim 1, further comprising the step of positioning the gear on a base at a position indicated by a laser to image the gear.

4. A method for inspecting contours of a gear, as recited in claim 1, wherein the step of imaging the gear comprises magnifying the gear image in a manner such that a magnified gear image is formed on the imaging surface and the first digitized image is indicative of the magnified gear image.

5. A method for inspecting contours of a gear, as recited in claim 4, wherein the microscope having an indexing scale is used to magnify the gear image and wherein the step of magnifying the gear image comprises indexing the microscope using the indexing scale in a manner such that the gear image is in focus.

6. A method for inspecting contours of a gear, as recited in claim 1, wherein the step of imaging comprises the step of imaging onto the CCD camera.

7. A method for inspecting contours of a gear, as recited in claim 1, wherein the pixels are assigned gray values between 0 and 255, inclusive.

8. A method for inspecting contours of a gear, as recited in claim 1, wherein step (a) comprises the step of transferring the first digitized image to a digital computer having an image grabber card for receiving the first digitized image.

9. A method for inspecting contours of a gear, as recited in claim 1, wherein step (c) comprises the step of using a contour-tracing algorithm to determine the first coordinates of pixels corresponding to the contours of the gear.

10. A method for inspecting contours of a gear, as recited in claim 1, wherein step (c) comprises the step of processing the first coordinates of pixels corresponding to the contours of the gear with the first digitized image and determining the second coordinates using a moment-preserving technique.

11. A method for inspecting contours of a gear, as recited in claim 1, wherein the manufacturing errors comprise runout error, profile error, and pitch error.

12. A method for inspecting contours of a gear, as recited in claim 11, wherein the pitch error comprises single pitch error, neighborhood pitch error and accumulated pitch error.

13. An apparatus for inspecting contours of a gear to determine manufacturing errors of the gear, comprising:

illuminating means for illuminating the gear with light;

converting means comprising an imaging surface optically coupled to the illuminating means for forming a gear image on the imaging surface and for generating a digitized image indicative of the gear image, the digitized image comprising a plurality of pixels each having first coordinates representing a location of the pixels within the digitized image; and processing means coupled to the converting means for receiving the first digitized image, comprising (a) assigning means for assigning a gray value to each pixel, (b) classifying means for classifying each pixel into a first or second class by comparing the gray value thereof to a predetermined threshold value, (c) extracting means for determining, based on the class of each pixel, the first coordinates of pixels corresponding to contours of the gear, and for determining second coordinates of pixels corresponding more precisely to the contours of the gear than the first coordinates, and (d) comparing means for comparing the second coordinates of pixels to a standard gear pattern to determine the manufacturing errors of the gear.

14. An apparatus for inspecting contours of a gear, as recited in claim 13, wherein the converting means comprises a CCD camera for generating the digitized image.

15. An apparatus for inspecting contours of a gear, as recited in claim 14, wherein the converting means comprises magnifying means coupled to the CCD camera for magnifying the gear image in a manner such that a magnified gear image is formed on the imaging surface and the digitized image is indicative of the magnified gear image.

16. An apparatus for inspecting contours of a gear, as recited in claim 15, wherein the magnifying means comprises a microscope having an indexing scale, the indexing scale for indexing the position of the microscope such that the gear image is in focus.

17. An apparatus for inspecting contours of a gear, as recited in claim 13, further comprising a laser optically coupled to the illuminating means for indicating a position on which to place the gear.

18. An apparatus for inspecting contours of a gear, as recited in claim 13, wherein the processing means comprises an image grabber card to receive the digitized image.

19. An apparatus for inspecting contours of a gear, as recited in claim 13, wherein the pixels are assigned gray values between 0 to 255, inclusive.

20. An apparatus for inspecting contours of a gear, as recited in claim 13, wherein the extracting means uses a contour-tracing algorithm to determine the first coordinates of pixels corresponding to the contours of the gear.

21. An apparatus for inspecting contours of a gear, as recited in claim 13, wherein the extracting means uses a moment-preserving technique to determine the second coordinates.

22. An apparatus for inspecting contours of a gear, as recited in claim 13, wherein the manufacturing errors comprise runout error, profile error and pitch error.

23. An apparatus for inspecting contours of a gear, as recited in claim 22, wherein the pitch error comprises single pitch error, neighborhood pitch error and accumulated pitch error.

24. An apparatus for inspecting contours of a gear to determine manufacturing errors of the gear, comprising:

illuminating means for illuminating the gear with light;

converting means comprising an imaging surface optically coupled to the illuminating means for forming a gear image on the imaging surface and for generating a digitized image using a CCD camera, the digitized image indicative of the gear image, the digitized image comprising a plurality of pixels each having first coordinates representing a location of the pixels within the digitized image; and processing means coupled to the converting means for receiving the first digitized image, comprising
(a) assigning means for assigning a gray value to each pixel,
(b) classifying means for classifying each pixel into a first or second class by comparing the gray value thereof to a predetermined threshold value,
(c) extracting means for determining, based on the class of each pixel, the first coordinates of pixels corresponding to contours of the gear; and for determining second coordinates of pixels corresponding more precisely to the contours of the gear than the first coordinates, and
(d) comparing means for comparing the second coordinates of pixels to a standard gear pattern to determine the manufacturing errors of the gear.

25. An apparatus for inspecting contours of a gear, as recited in claim 24, wherein the converting means comprises magnifying means coupled to the CCD camera for magnifying the gear image in a manner such that magnified gear image as formed on the imaging surface and the digitized image is indicative of the magnified gear image.

26. An apparatus for inspecting contours of a gear, as recited in claim 25, wherein the magnifying means comprises a microscope having an indexing scale, the indexing scale for indexing the position of the microscope such that the gear image is in focus.

27. An apparatus for inspecting contours of a gear, as recited in claim 24, further comprising a laser optically coupled to the illuminating means for indicating a position on which to place the gear.

28. An apparatus for inspecting contours of a gear, as recited in claim 24, wherein the processing means comprises an image grabber card to receive the digitized image.

29. An apparatus for inspecting contours of a gear, as recited in claim 24, wherein the pixels are assigned gray values between 0 and 255, inclusive.

30. An apparatus for inspecting contours of a gear, as recited in claim 24, wherein the extracting means uses a contour-tracing algorithm to determine the first coordinates of pixels corresponding to the contours of the gear.

31. An apparatus for inspecting contours of a gear, as recited in claim 24, wherein the extracting means uses a moment-preserving technique to determine the second coordinates.

32. An apparatus for inspecting contours of a gear, as recited in claim 24, wherein the manufacturing errors comprise runout error, profile error and pitch error.

33. An apparatus for inspecting contours of a gear, as recited in claim 32, wherein the pitch error comprises single pitch error, neighborhood pitch error and accumulated pitch error.

* * * * *